US011773497B2

(12) United States Patent
Henry et al.

(10) Patent No.: US 11,773,497 B2
(45) Date of Patent: Oct. 3, 2023

(54) COMBINED CYCLE POWER SYSTEM

(71) Applicants: Massachusetts Institute of Technology, Cambridge, MA (US); Northwestern University, Evanston, IL (US)

(72) Inventors: Asegun Henry, Boston, MA (US); Ahmed Fouad Ghoniem, Winchester, MA (US); Michael Bichnevicius, Downingtown, PA (US); Mehdi Pishahang, Waltham, MA (US); Sossina Haile, Evanston, IL (US)

(73) Assignees: Massachusetts Institute of Technology, Cambridge, MA (US); Northwestern University, Evanston, IL (US)

( * ) Notice: Subject to any disclaimer, the term of this patent is extended or adjusted under 35 U.S.C. 154(b) by 199 days.

(21) Appl. No.: 17/192,160

(22) Filed: Mar. 4, 2021

(65) Prior Publication Data
US 2021/0277524 A1 Sep. 9, 2021

Related U.S. Application Data

(60) Provisional application No. 63/047,228, filed on Jul. 1, 2020, provisional application No. 62/985,157, filed on Mar. 4, 2020.

(51) Int. Cl.
C25B 9/23 (2021.01)
B01D 53/32 (2006.01)
(52) U.S. Cl.
CPC .............. *C25B 9/23* (2021.01); *B01D 53/326* (2013.01)

(58) Field of Classification Search
CPC ........... C25B 9/23; C25B 13/02; C25B 13/07; C25B 1/02; B01D 53/326; F23D 14/32; F02M 25/12; F23C 2203/30; F23C 2900/03008; Y02E 20/16; Y02P 20/129
See application file for complete search history.

(56) References Cited

U.S. PATENT DOCUMENTS

| | | | |
|---|---|---|---|
| 5,811,201 A | 9/1998 | Skowronski | |
| 5,820,654 A | 10/1998 | Gottzman et al. | |
| 2004/0002030 A1 | 1/2004 | Shah et al. | |
| 2013/0036723 A1 | 2/2013 | La Force | |
| 2016/0245125 A1* | 8/2016 | Watkins | .................. F01K 23/02 |
| 2017/0167037 A1 | 6/2017 | Rheaume | |

OTHER PUBLICATIONS

International Search Report and Written Opinion dated Jun. 1, 2021, for Application No. PCT/US02021/020803.

* cited by examiner

*Primary Examiner* — Jacob M Amick
*Assistant Examiner* — Charles J Brauch
(74) *Attorney, Agent, or Firm* — Wolf, Greenfield & Sacks, P.C.

(57) ABSTRACT

The present disclosure generally relates in certain embodiments to a combined cycle power plant system comprising an electrochemical compressor. For instance, in one set of embodiments, the electrochemical compressor is may separate oxygen from a flow of air from an air source to provide a pressurized flow of oxygen to a combustor. In some embodiments, the resulting combustion products may only include oxygen and water without any substantial fraction of other combustion products or contaminants which may facilitate the separation of carbon dioxide ($CO_2$) for subsequent processes including compression and/or storage.

26 Claims, 5 Drawing Sheets

COMBINED CYCLE POWER SYSTEM

CROSS-REFERENCE TO RELATED APPLICATIONS

This application claims the benefit under 35 U.S.C. § 119(e) of U.S. provisional application Ser. No. 62/985,157, filed Mar. 4, 2020, and U.S. provisional application Ser. No. 63/047,228, filed Jul. 1, 2020, the disclosures of which are incorporated by reference in their entirety.

FIELD

Disclosed embodiments are related to a combined cycle power system and related methods.

BACKGROUND

Natural gas combined cycle (NGCC) is the state of the art technology that has been heavily used in producing power from a fuel source. A natural gas combined cycle generates electricity by burning natural gas from a fuel source with a flow of air. A natural gas combined cycle typically includes a gas turbine including an adiabatic compressor that is used to compress a flow of air, a combustor for burning the fuel, and a turbine that is used to generate electricity as the combustion products expand through the turbine. A natural gas combined cycle may be used with a separate carbon capture and storage system (CCS), where the CCS is used to separate the emitted $CO_2$ from the power plant.

SUMMARY

In one embodiment, a combined cycle power plant system includes: an air source; a fuel source; an electrochemical compressor in fluid communication with the air source; a combustor in fluid communication with the fuel source and electrochemical compressor; and a power turbine in fluid communication with the combustor. The electrochemical compressor is configured to separate oxygen from a flow of air from the air source, and the combustor is configured to combust oxygen from the electrochemical compressor with fuel from the fuel source.

In one embodiment, a method includes: separating oxygen from a flow of air using an electrochemical compressor; flowing the separated oxygen into a combustor; and combusting the oxygen with a fuel to drive a power turbine.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
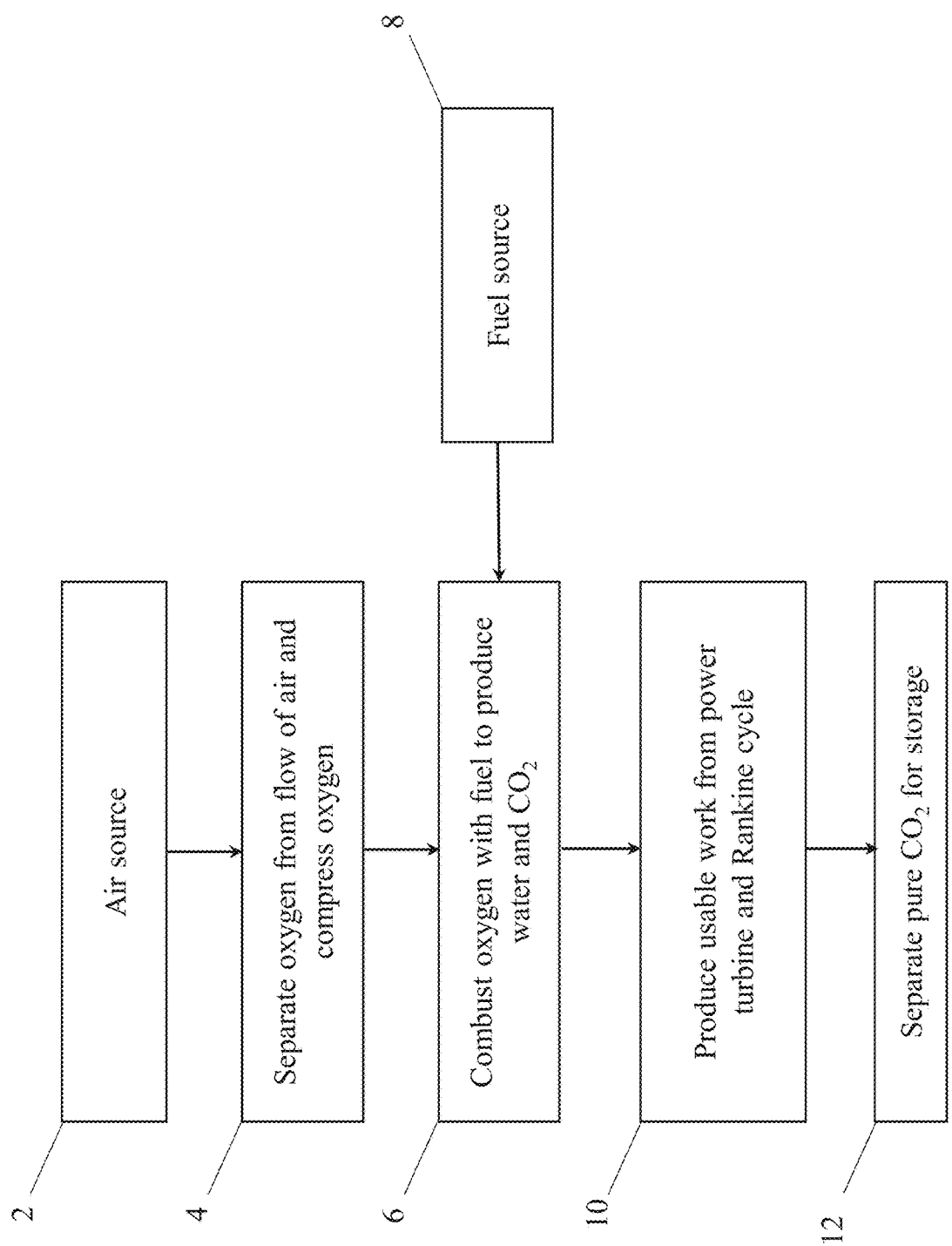
FIG. 1 is a flow diagram of a method for operating a combined power plant system, in accordance with certain embodiments.

Carbon capture and storage (CCS) from exhaust of power plants typically increases the levelized cost of electricity (LCOE) as compared to a base case power plant without carbon capture and storage (CCS), by approximately 30-50%. As a result, it is difficult to economically justify its usage without some form of penalty for emitting $CO_2$ (e.g., a carbon tax), or benefit for not emitting $CO_2$. Additionally, another problem associated with carbon capture and storage (CCS) is its drag on the response time and therefore limitation on the flexibility of fossil fueled power plants. Current state of art natural gas combined cycle (SOA NGCC) technologies treat carbon separation as a separate problem from the power generation process itself, thereby rendering it an added cost and efficiency penalty with respect to a base case scenario without carbon capture and storage (CCS).

In view of the above, the Inventors have recognized the benefits associated with designing a power plant where the entire power plant is designed to integrate carbon capture and storage (CCS) into the power plant system to allow a more natural and efficient process of carbon capture and storage (CCS) from the beginning of the combined power plant cycle. Additionally, certain aspects of the present disclosure are related to the exploitation of the fundamental difference between mechanical and electrochemical compression in a combined power cycle to raise the cycle efficiency of a combined power plant system. For instance, the inefficiency in a natural gas combined cycle (NGCC) typically results from the mechanical work used to run the compressor. The purpose of the compressor is simply to raise the pressure of the inlet air, such that the pressurized air can be supplied to the combustor and provide a strong driving force for the expander turbine to extract energy (e.g., work). The problem is that the compression associated in a NGCC is nominally adiabatic and therefore ideally isentropic, which results in large mechanical work inputs. The large input work to compress the air subtracts from the work output that would be obtained from the expander turbine, which consequently lowers the overall cycle efficiency of the NGCC cycle. It should be noted that the work used by the adiabatic compressor in a NGCC is not a small fraction of the expander turbine work. Typically, between 30-50% of the expander work is sacrificed in running the adiabatic compressor.

Based on the forgoing, the Inventors have recognized the benefits associated with the use of an electrochemical compressor in a combined power cycle, which may be used to lower the work used for compression and realize a higher efficiency cycle in a combined power plant system. The higher cycle efficiency may be used to offset the cost associated with using a more expensive electrochemical compressor. This may permit the use of a system with integrated carbon capture and storage (CCS) with overall operating costs that are the same cost or somewhat cheaper than a state of art natural gas combined cycle (SOA NGCC) without carbon capture and storage (CCS). In addition to this major benefit on cost, the system may also be more flexible than state of art carbon capture and storage (SOA-CCS) systems, as the electrochemical compressor may exhibit faster transients than the rest of the power plant. Thus, the currently disclosed systems may have response times and functional flexibility that are similar to a state of art natural gas combined cycle (SOA NGCC). Accordingly, the disclosed systems may facilitate the integration of carbon capture and storage (CCS) capabilities in more power plants, or other power generators, at similar costs while also offering improved efficiencies. Though instances in which any of the systems disclosed herein do not include a CSS system are also contemplated.

Certain aspects of the disclosure are related to a combined cycle power plant system. In some embodiments, the combined cycle power plant system comprises an air source and an electrochemical compressor in fluid communication with the air source configured to separate oxygen from a flow of air from the air source. In some instances, the electrochemical compressor comprises an anode and a cathode, in addition to a membrane (e.g., electrolyte) that can separate oxygen from a flow of air from the air source. For example, as an electrical potential is applied between the anode and cathode of the electrochemical compressor, oxygen can be separated from a flow of air while the electrochemical compressor simultaneously pressurizes the oxygen isothermally to a desired pressure. In accordance to certain embodiments, the combined cycle power plant system further comprises a combustor (e.g., oxycombustor or other appropriate combustor) in fluid communication with a fuel source and the output of the electrochemical compressor for the pressurized flow of oxygen. As the pressured oxygen flows into the combustor, the combustor may be configured to combust a fuel from the fuel source with the pressurized oxygen to form combustion products comprising substantially water and $CO_2$. The combined cycle power plant may further comprise a power turbine in fluidic communication with the combustor, where the combustion of oxygen with the fuel can be used to drive the power turbine. The power turbine may in turn produce usable work that can be converted into electricity. In some embodiments, the combined cycle power plant may comprise additional unit operations (e.g., heat exchangers, Rankine cycle, condenser, etc.) that may contribute to an enhanced overall cycle efficiency.

As mentioned above, a combined cycle power plant system may replace the adiabatic compressor from a normal natural gas combined cycle (NGCC) with an electrochemical compressor. By doing so, several benefits may be achieved. First, a higher compressor efficiency may be achieved, which leads to a higher overall cycle efficiency. In some cases, a cycle efficiency between or equal to 0.63 and 0.75 may be achieved. However, any appropriate range of efficiencies may be provided for a particular cycle as the disclosure is not limited to the specific range of efficiencies noted above. Second, separation of oxygen from air may allow oxy-combustion and work-free separation of a pure $CO_2$ stream after steam condensation using, for example, a condenser. Thus, the disclosed systems may include an improved efficiency as compared to systems where a separate $CO_2$ separation process is used. Third, the use of an electrochemical compressor in the system may allow for faster response times than state of art carbon capture systems (SOA-CCS), on the order tens of minutes, which may allow for greater flexibility. Overall, the electrochemical oxygen compression combined cycles can achieve efficient $CO_2$ separation and at the same time, a more efficient power generation, compared to current state of the art natural gas combined cycle systems (NGCCs).

As noted above, in certain embodiments, oxygen is separated from a flow of air using an electrochemical compressor which may comprise a membrane electrode assembly. In some embodiments, the electrochemical compressor comprises an anode, a cathode, and a membrane configured to separate oxygen from the flow of air. The membrane may be positioned between the anode and the cathode and may selectively allow for oxygen from a flow of air to pass from the anode to the cathode. Depending on the embodiment, the membrane electrode assembly (MEA) may be provided in the form of a stack, e.g., a planar stack. For instance, the stack may comprise three layers—an anode layer, a membrane layer (e.g., a solid electrolyte layer) adjacent the anode layer, and a cathode layer adjacent the membrane layer with the membrane layer disposed between the anode and cathode layers. The anode and/or cathode layer may comprise an ionically-conducting material, or a combination of ionically-conducting and electrically conducting material. Correspondingly, the membrane layer may comprise ionically-conducting materials. The membrane electrode assembly stack may further comprise gas channels to both direct the flow of air to the electrochemical compressor as well as to direct the separated flows of air and oxygen out of the electrochemical compressor after separation.

In some instances, the membrane may be a solid electrolyte, e.g., a solid oxide electrolyte, or any other ionically-conducting material that is configured to separate oxygen from the flow of air. For example, the membrane may comprise yttria ($Y_2O_3$) stabilized zirconia ($ZrO_2$) (i.e., YSZ), which has an affinity for oxygen ions at elevated temperatures. Other solid electrolyte materials having an affinity for oxygen ions may be used for the electrochemical compressor.

In some instances, the anode and/or cathode may comprise an ionically-conducting oxide (e.g., yttria stabilized zirconia (YSZ)). In some instances, the anode and/or cathode may comprise a mixture of ionically-conducting material and an electronically-conducting material. For example, an ionically conducting oxide (e.g., yttria stabilized zirconia (YSZ)) and an electronically-conducting oxide (e.g., (La, Sr)$MnO_3$ (LSM)) may be combined to form an anode and/or cathode. It should be noted that the material used for construction of the anode and/or cathode is not so limited, and that any appropriate ionically-conducting (and electrically-conducting) materials can be used for construction of the anode and/or cathode.

Depending on the particular embodiment, the membrane (e.g., solid electrolyte) of an electrochemical compressor as described herein may have any of a variety of appropriate thicknesses. In some embodiments, the membrane has a thickness of at least 5 microns, at least 7.5 microns, at least 10 microns, at least 15 microns, at least 25 microns, at least 50 microns, at least 75 microns, at least 100 microns, at least 150 microns, at least 200 microns, at least 200 microns, or at least 250 microns. In some embodiments, the membrane has a thickness of no more than 300 microns, no more than 250 microns, no more than 200 microns, no more than 150 microns, no more than 150 microns, no more than 100 microns, no more than 75 microns, no more than 50 microns, no more than 25 microns, no more than 10 microns, or no more than 7.5 microns. A combination of the above-referenced ranges is possible (e.g., greater than or equal to 5 microns and less than or equal to 300 microns). Other ranges are also possible.

In some embodiments, various additives may be introduced into the anode and/or cathode to promote the electrochemical performance of the electrochemical compressor. For instance, in one set of embodiments, a catalyst material may be added. Non-limiting examples of possible catalyst materials may include $(Sm,Sr)CoO_3$, $Sr(Ti,Fe,Co)O_3$, PrOx, a combination thereof, and/or any other appropriate catalyst material.

According to certain embodiments, the operating temperature of an electrochemical compressor may be set to a temperature that facilitates oxygen ion transport across the membrane from the anode to the cathode in an electrochemical compressor. In some embodiments, depending on the particular material, the operating temperature of the electrochemical compressor may be less than or equal to 1200° C., less than or equal to 1100° C., less than or equal to 1000° C., less than or equal to 900° C., less than or equal to 800° C., or less than or equal to 600° C. Correspondingly, the operating temperature may be at least 700° C., at least 800° C., at least 900° C., at least 1000° C., or at least 1100° C. Combinations of these ranges are contemplated including, for example, operating temperatures that are between or equal to 600° C. and 1200° C., or between 700° C. and 1100° C. Other ranges are also possible. For instance, for an yttria stabilized zirconia (YSZ) based membrane, an operating temperature may be between or equal to 700° C. and 900° C. It should be noted that the operating temperature is not limited to the ranges and values presented herein since the operating temperature may depend on parameters such as the type of membrane (e.g., types of solid oxide electrolyte) and the desired conductivity of oxygen transfer through the membrane.

In some instances, it may be advantageous for the anode and cathode layers to be porous to permit the flow of air and oxygen through the layers and for the membrane layer (e.g., solid electrolyte) to be relatively non-porous such that it is substantially impermeable to the flow of air while permitting ionic oxygen to pass through the membrane. In some instances, a sintering process may be used to achieve a reasonably dense non-porous membrane layer and the desired level of porosity in both of the electrodes. According to some embodiments, the sintering process may occur at a temperature of less than or equal to 1450° C., less than or equal to 1400° C., less than or equal to 1350° C., less than or equal to 1300° C., less than or equal to 1250° C., less than or equal to 1200° C., less than or equal to 1150° C., less than or equal to 1100° C., and/or any other appropriate temperature. In some instances, the temperature may be greater than or equal to 1050° C., greater than or equal to 1100° C., greater than or equal to 1150° C., greater than or equal to 1200° C., greater than or equal to 1250° C., greater than or equal to 1300° C., greater than or equal 1350° C., greater than or equal 1400° C., greater than or equal 1450° C., and/or any other appropriate temperature. Combinations of these are also possible; for example, the sintering temperature may be between 1200° C. and 1450° C., or between 1250° C. and 1400° C. However, sintering temperatures both less than or greater than those noted above are also contemplated depending on the particular materials used.

During operation of an electrochemical compressor, an electrical potential may be applied between an anode and a cathode of the electrochemical compressor to separate oxygen from a flow of air and to pressurize the oxygen. For instance, an input voltage may cause current to flow and oxygen ions to conduct through the membrane (e.g., solid oxide electrolyte) against an oxygen ion chemical potential. According to certain embodiments, the flow of oxygen ions can be ceased when a difference in oxygen partial pressure ($PO_2$) corresponding to the applied voltage has been established between the two sides of the membrane. In some embodiments, the pure oxygen stream may be released on the opposite side of the membrane at higher pressure, e.g., a pressure close to, or approximately equal to, the operating pressure of a combustor downstream from the electrochemical compressor. For instance, the electrochemical compressor may allow for production of oxygen at a pressure that is an order of magnitude or more higher than the pressure of oxygen from the air stream that enters into the compressor.

In some embodiments, the electrochemical compressor may allow for production of oxygen at a pressure that is at least 50 times, at least 75 times, at least 100 times, at least 125 times, at least 150 times, at least 200 times, at least 250 times, at least 300, at least 350 times, or at least 400 times the pressure of oxygen from the air stream that enters into the compressor. In some embodiments, the electrochemical compressor may allow for production of oxygen at a pressure that is no more than 500 times, no more than 400 times, no more than 350 times, no more than 300 times, no more than 250 times, no more than 200 times, no more than 150 times, no more than 125, no more than 100 times, or no more than 75 times the pressure of oxygen from the air stream that enters into the compressor. Combination of the above-referenced ranges are possible (e.g., at least 50 times and no more than 500 times, or at least 75 times and no more than 350 times). Other ranges are also possible.

In some embodiments, the electrochemical compressor is configured to compress oxygen from a flow of air to a pressure that is greater than or equal to 20 atm, greater than or equal to 30 atm greater than or equal to 40 atm, greater than or equal to 50 atm, or greater than or equal to 60 atm. In some embodiments, the electrochemical compressor is configured to compress oxygen from a flow of air to a pressure that is less than or equal to 70 atm, less than or equal to 60 atm, less than or equal to 50 atm, less than or equal to 40 atm, or less than or equal to 30 atm. Combination of the above-referenced ranges are possible (e.g., greater than or equal to 20 atm and less than or equal to 70 atm). Other ranges are also possible. For example, in one set of embodiments, oxygen may be extracted from air at 0.21 atm and produced as a substantially pure oxygen stream at 30 atm to 70 atm.

In some embodiments, an electrochemical compressor is configured to isothermally compress the oxygen. For instance, electrochemical compression may occur isothermally because of a direct increase in density as the oxygen ions are conducted through the electrochemical membrane. Specifically, the ideal gas law $P=\rho RT$ shows that an increase in pressure can be achieved in one of two ways, or a combination of the two i.e., by either increasing the temperature T, or increasing the density ρ. In accordance with certain embodiments, and without wishing to be bound by theory, electrochemical compression involves a direct increase in density ρ, which allows temperature T to remain constant. This direct increase in ρ comes from the oxygen ions in the membrane being forced from first lower concentration on a first side of the membrane to second higher concentration on a second opposing side of the membrane (i.e., low to high density).

In some embodiments, an electrochemical compressor is configured to compress the oxygen in a manner that is substantially isothermal. As used herein, the term "substantially isothermal" may refer to a temperature that remains substantially constant, such that the temperature varies no more than 50° C. (e.g., no more than 40° C., no more than 30° C., no more than 20° C., no more than 10° C., no more than 5° C., or no more than 0° C.) during the oxygen compression process.

In some embodiments, at least one heat exchanger is fluidically coupled to the electrochemical compressor and may be used to preheat the flow of air from an air source before the air enters into the electrochemical compressor. For instance, the at least one heat exchanger (e.g. two heat exchangers in parallel) may be used to preheat an incoming flow of air before the flow of air enters into the electrochemical compressor. In some cases, the heat exchanger may be a liquid droplet heat exchanger configured to transfer heat from a flow of gas to another flow of gas by using an intermediate liquid heat exchanger fluid. However, it should be noted any heat exchanger(s) may be used to preheat the flow of air from an air source before the air enters into the electrochemical compressor. It should be noted the at least one heat exchanger may be configured to preheat the flow of air to a temperature closer to the operating temperature of the electrochemical compressor. According to some embodiments, the temperature of the preheated flow of air may be within 5° C. to 50° C. of the operating temperature of the electrochemical compressor. In some embodiments, the difference in temperature between the preheated flow of air and the operating temperature of the electrochemical compressor may be less than or equal to 100° C., less than or equal to 75° C., less than or equal to 50° C., less than or equal to 25° C., less than or equal to 5° C., and/or any other appropriate difference relative to the operating temperature of the electrochemical compressor.

In some cases, the temperature of the preheated flow of air is greater than or equal to 700° C., greater than or equal to 750° C., greater than or equal to 800° C., or greater than or equal to 850° C. In some embodiments, the temperature of the preheated flow of air is less than or equal to 900° C., less than or equal to 850° C., less than or equal to 800° C., or less than or equal to 750° C. Combination of the above-referenced ranges are possible (e.g., greater than or equal to 700° C. and less than or equal to 900° C. Other ranges are also possible.

As previously noted, certain embodiments may include flowing a separated flow of oxygen into a combustor that is in fluidic communication with a fuel source and the electrochemical compressor. In some embodiments, the combustor is configured to combust the oxygen from the electrochemical compressor with the fuel from the fuel source to produce combustion products which may be used to drive a power turbine. In some cases, the combustor comprises an oxy-combustor that is capable of oxy-combustion, e.g., a combustion process of burning fuel using pure oxygen instead of air as the primary oxidant, which may produce an exhaust stream that contains substantially pure flow of gaseous $H_2O$ and $CO_2$ without the presence of a substantial concentration of other byproducts or contaminants. In some instances, the fuel may be a natural gas, e.g., primarily methane and potentially comprising various amounts of other higher alkanes. In some embodiments, a substantially pure flow of gaseous $H_2O$ and $CO_2$ may correspond to the flow of combustion products comprising at least 80 atomic percent (at %), at least 90 at %, at least 95 at %, at least 99 at %, or any other appropriate percentage of gaseous $H_2O$ and $CO_2$.

In some embodiments, the combustion of a fuel and oxygen may occur adiabatically in the combustor, thus leading to a high average temperature (e.g., adiabatic flame temperature) associated with the combustion process and the resultant combustion products. In such embodiments, a diluent may be flowed into the combustor to reduce an average temperature of the combustor during combustion. For instance, a flow of condensed $H_2O$ may be transported into the combustor as a diluent to reduce an average temperature (e.g., adiabatic flame temperature) of the combustor during combustion. A reduction in the average temperature may advantageously generate combustion products having suitable temperatures for the next stage of operation, e.g., a power turbine. It should be noted that because a turbine is typically operated at temperatures between 1400-1500° C. to avoid thermal damage to the components. Thus, in some embodiments, the temperature of the combustion products entering into the turbine may be less than or equal 1400-1500° C. In some embodiments, the combustion products from the combustion of the fuel and oxygen have a temperature of greater than or equal to 1200° C., greater than or equal to 1250° C., greater than or equal to 1300° C., greater than or equal to 1350° C., greater than or equal to 1400° C., or greater than or equal to 1450° C. In some embodiments, the combustion products from the combustion of the fuel and oxygen have a temperature of less than or equal to 1500° C., less than or equal to 1450° C., less than or equal to 1400° C., less than or equal to 1350° C., less than or equal to 1300° C., or less than or equal to 1250° C. Combination of the above-referenced ranges are possible (e.g., greater than or equal to 1200° C. and less than or equal to 1500° C.). Other ranges are also possible.

In some embodiments, a power turbine is in fluid communication with the combustor. In some cases, the power turbine is an expander turbine. For instance, the combustion products $H_2O$ and $CO_2$ from the combustor may be passed into the power turbine at an elevated temperature and pressure. It should be noted that in some embodiments, the temperature of the combustion products entering into the power turbine (e.g., expander turbine) may be no more than 1500° C., no more than 1400° C., etc., to allow safe operation of the turbine. The power turbine may in turn extract energy (e.g., work) from the hot and pressurized flow of combustion products including gaseous $H_2O$ and $CO_2$. The flow of combustion products including $H_2O$ and $CO_2$ exiting out of the power turbine may comprise a reduced pressure and a reduced temperature. In some instances, the reduced temperature may be greater than or equal to 500° C., greater than or equal to 550° C., greater than or equal to 600° C., or greater than or equal to 650° C. In some embodiments, the reduced temperature may be less than or equal to 700° C., less than or equal to 650° C., less than or equal to 650° C., or less than or equal to 550° C. Combination of the above-referenced ranges are possible (e.g., greater than or equal to 500 and less than or equal to 700° C.). Other ranges are also possible. In some embodiments, the reduced pressure may be about atmospheric pressure.

In some embodiments, the system further comprises a condenser downstream from the combustor configured to condense the gaseous $H_2O$ and produce a flow of substantially pure $CO_2$. "Substantially," as used herein, may refer to an amount of at least 50 atomic percent (at %), at least 60 at %, at least 70 at %, at least 80 at %, at least 90 at %, at least 95 at %, or at least 99 at %. The condenser may result in a flow of condensed liquid $H_2O$ where at least a portion of the liquid $H_2O$ may be recycled into the combustor as a diluent to reduce an average temperature of the combustor during combustion. In some embodiments, at least 20 wt %, e.g., at least 30 wt %, at least 40 wt %, at least 50 wt %, at least 60 wt %, at least 70 wt %, at least 80 wt %, at least 90 wt % of the condensed liquid $H_2O$ exiting the condenser is recycled. In some embodiments, no more than 95 wt %, e.g., no more than 90 wt %, no more than 80 wt %, no more than 70 wt %, no more than 60 wt %, no more than 50 wt %, no more than 40 wt %, no more than 30 wt %, no more than 20 wt % of the condensed liquid $H_2O$ exiting the condenser is recycled. Combinations of the above-referenced ranges are possible (greater than or equal to 20 wt % and less than or equal to 95 wt %). Other ranges are also possible. In some embodiments, the substantially pure flow of $CO_2$ exiting out of the condenser may be eventually compressed and stored as a part of carbon capture and storage (CCS) in the combined power plant system.

In some embodiments, a Rankine cycle may be fluidically connected to the power turbine to allow further extraction of energy (e.g., work) from the flow of $H_2O$ and $CO_2$ exiting out of the power turbine. In addition to generating work, the Rankine cycle may recover at least a portion of the heat exiting the turbine. In some cases, the heat may be used to heat a flow of condensed $H_2O$ that is transported into the combustor as a diluent.

According to some embodiments, the system comprises a cycle efficiency of at least 0.63. In some instances, the cycle efficiency may be greater than or equal to 0.6, greater than or equal to 0.63, greater than or equal to 0.65, greater than or equal to 0.67, greater than or equal to 0.7, greater than or equal to 0.73, greater than or equal to 0.75, or greater than or equal to 0.8. In some cases, the cycle efficiency may be less than or equal to 0.85, less than or equal to 0.8, less than or equal to 0.75, less than or equal to 0.73, less than or equal to 0.7, less than or equal to 0.67, less than or equal to 0.65, or less than or equal to 0.63. Combinations of these are also possible; for example, the system may have a cycle efficiency of greater than or equal to 0.63 and less than or equal to 0.85. Other ranges are also possible. The above efficiencies may be converted into efficiency percentages by multiplying by a factor of 100.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Certain aspects of the present disclosure relate to a combined power plant system including an electrochemical oxygen compression combined cycle (EOC3). A non-limiting flow diagram of the operation of such an embodiment is shown in FIG. 1. In FIG. 1, air from an air source 2 is first passed into an electrochemical compressor. The electrochemical compressor replaces the mechanical compressor associated with typical systems and can be used to separate out and compresses $O_2$ from an air source (e.g., as shown in 4 of FIG. 1). The separated and compressed $O_2$ can next be fed into a combustor along with a fuel source 8. This may allow oxycombustion (e.g., a combustion process of burning fuel using pure oxygen instead of air as the primary oxidant) which produces an exhaust stream that only contains substantially pure $H_2O$ and $CO_2$ as the combustion products (e.g., as shown in 6 of FIG. 1). However, it should be understood that the presence of some minor amount of contaminants, other combustion products, and/or a separate diluent may be present in the exhaust stream as the disclosure is not limited in this fashion. As shown in 10 of FIG. 1, usable work may be produced as the combustion products are passed through a series of unit operations (e.g., expansion turbine, Rankine cycle, etc.) that are capable of generating usable work. After extraction of usable work from the series of unit operations, the combustion products may be processed to separate $CO_2$ for storage (e.g., as shown in 12 of FIG. 1). The carbon capture and storage (CCS) may occur by condensing the $H_2O$ from the exhaust stream, thereby leaving behind a substantially pure flow of $CO_2$ which may include some relatively small residual water vapor in the gas flow, which can then be separated from a flow of condensed water for subsequent compression and/or storage. While FIG. 1 shows one embodiment of operation of a combined power plant system, it should be understood that the operation of a combined power plant system is not so limited and that alternative embodiments are also possible. For instance, in some embodiments, the exhaust stream produced from combustion (e.g., as shown in 6 of FIG. 1) may be introduced directly into a separation unit (e.g., condenser) for $CO_2$ separation (e.g., as shown in 12 of FIG. 1).

Figure 2:
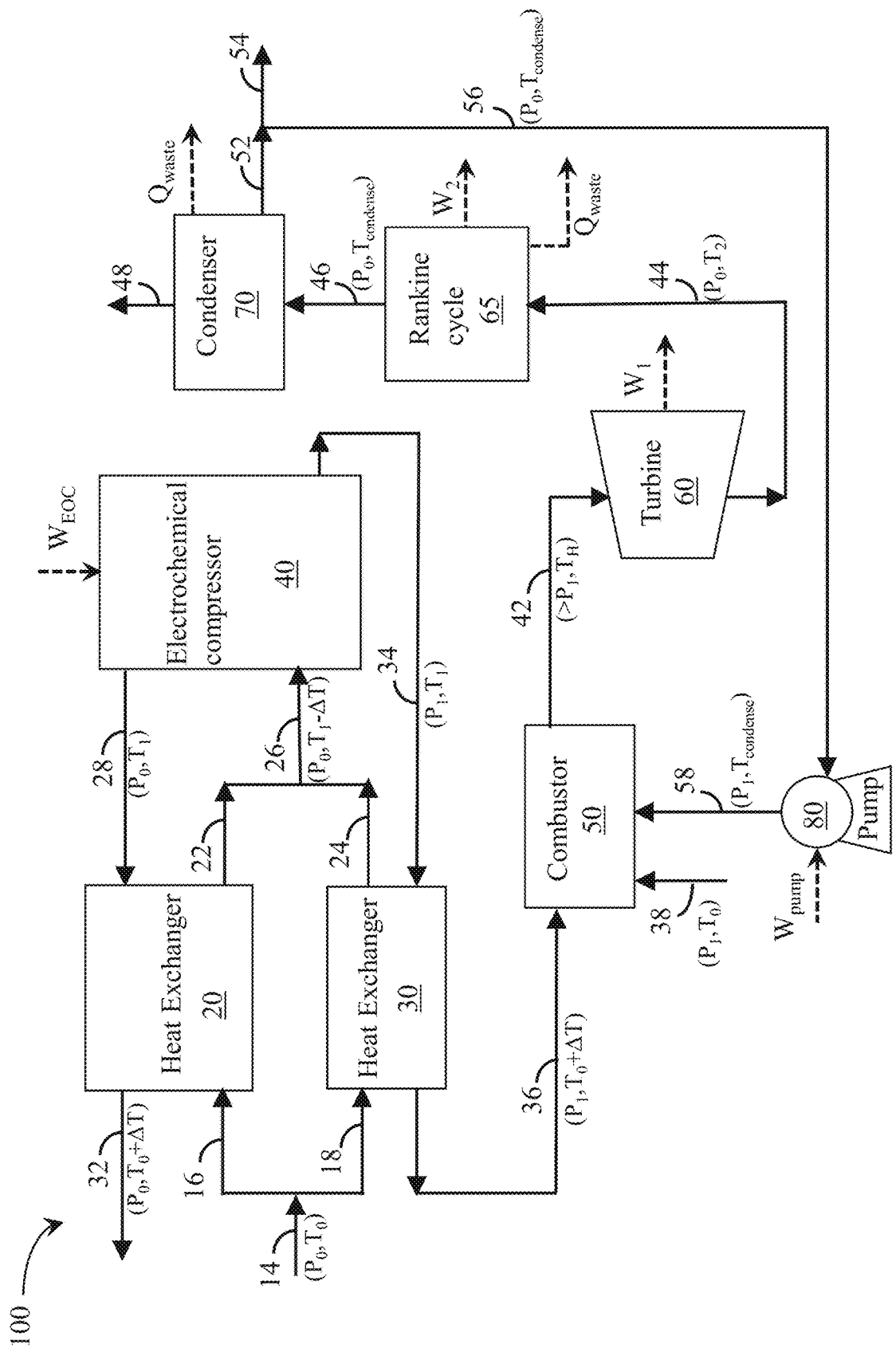
FIG. 2 is a schematic of a combined power plant system, in accordance with certain embodiments.

FIG. 2 shows an embodiment of one non-limiting configuration of a combined power plant system similar to that described in FIG. 1. The temperature and pressure of each steam entering and leaving each unit operation are referred to as $T_i$ and $P_i$ for convenience in the following description of the combined power plant system, where $T_0=25°$ C., $T_1=700°$ C. to $900°$ C., $T_H=1200°$ C. to $1500°$ C., $T_{condense}=100°$ C., $T_2=500°$ C. to $700°$ C., $\Delta T=5\text{-}50°$ C., and $P_0=1$ atm, $P_1=20$ atm to 70 atm, unless stated otherwise. Of course while particular temperatures and pressures are noted in relation to the figure, it should be understood that other embodiments may exhibit different temperatures and pressures either greater than and/or less than those noted above as the disclosure is not limited in this fashion.

As illustrated in FIG. 2, $O_2$ can be first brought into a combined power plant system 100 via a blower or other air source that pulls in ambient air (e.g., stream 14 at $T_0$ and $P_0$). Prior to being passed into an electrochemical compressor 40, the ambient air 14 may be passed through at least one or more additional unit operations for preheating. For instance, in accordance with certain embodiments, at least one heat exchanger is fluidically coupled to the air source and the electrochemical compressor such that the heat exchanger can be configured to preheat the flow of ambient air 14 from the air source prior to flowing into the electrochemical compressor. As shown in FIG. 2, before entering into the electrochemical compressor, the ambient air first moves through a heat exchanger system such that the air can be preheated close to the electrochemical compressor's operating temperature. The electrochemical compressor may have any of a variety of operating temperature as described previously (e.g., $T_1=700°$ C. to $900°$ C.). As shown in FIG. 2, the heat exchanger system may comprise two heat exchangers (HX) 20 and 30 working in parallel, where two ambient air streams 16 and 18 (split from ambient air stream 14) enter into the heat exchangers at ambient conditions ($T_0$, $P_0$), exit the heat exchangers as preheated air streams 22 and 24 at elevated temperature and pressures ($T_1-\Delta T$, $P_0$), and merge into one preheated air stream 26 ($T_1-\Delta T$, $P_0$) before entering into the electrochemical compressor 40. As described in more detail below, the separated flows of oxygen depleted air (e.g., stream 28 at $P_0$, $T_1$) and oxygen exiting the electrochemical compressor (e.g., stream 34 at $P_1$, $T_1$) may be fed into the two separate heat exchangers 20 and 30 to separately preheat the separate flows of air (e.g., streams 16 and 18) prior to the preheated air flowing into the electrochemical compressor 40.

Figure 4:
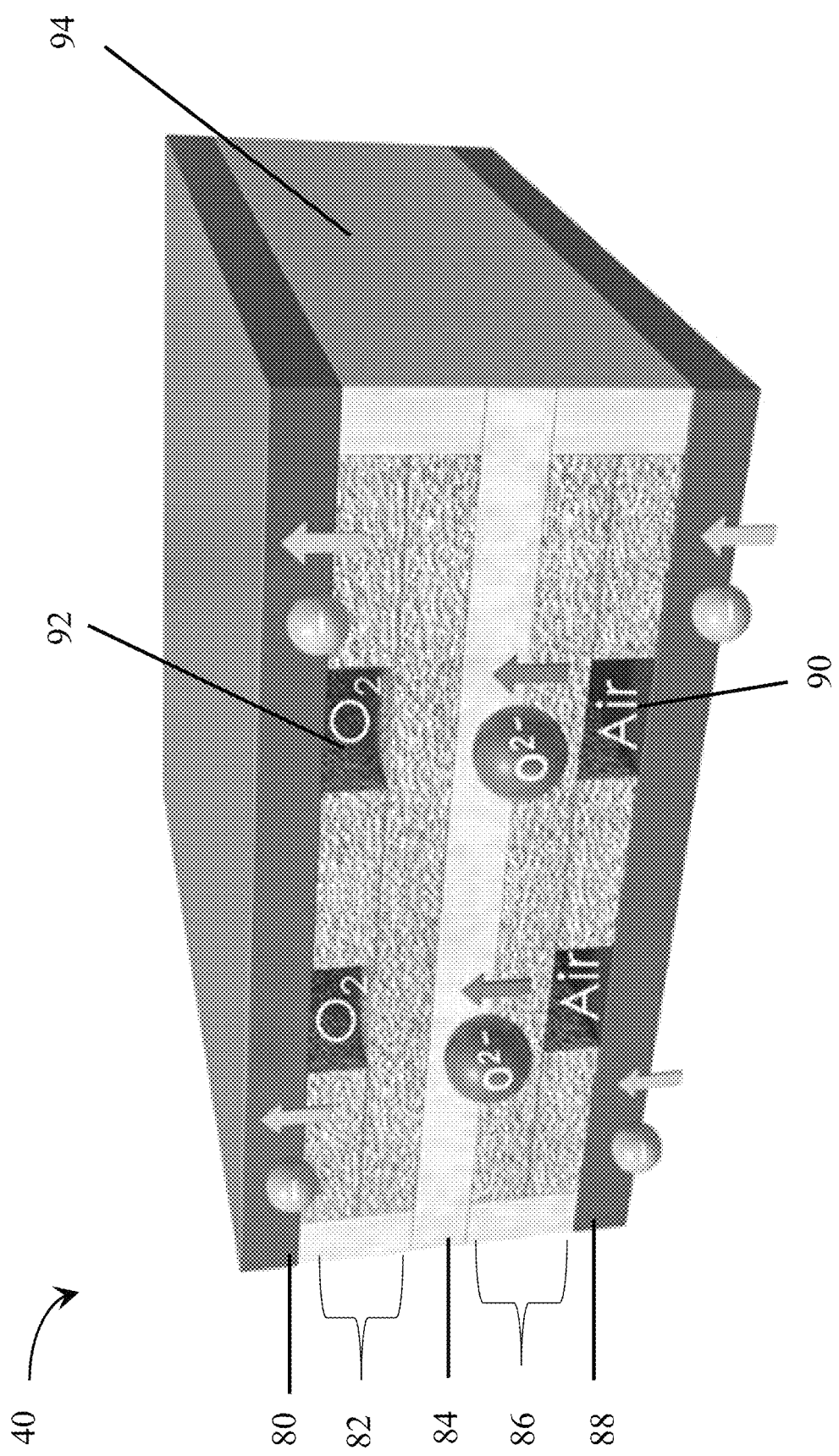
FIG. 4 is a cross-sectional schematic of an electrochemical compressor, in accordance with certain embodiments.

Once the air (e.g., stream 26 at $T_1-\Delta T$, $P_0$) reaches the electrochemical compressor 40, the $O_2$ from the air diffuses through the porous anode, then ionizes and diffuses through the solid oxide electrolyte, whereby it is forced up the gradient in oxygen ion density with an applied electrical potential (driven by work $W_{EOC}$ inputted into the electrochemical compressor). The electrical potential may be applied to the anode and cathode of the electrochemical compressor using any appropriate power source coupled to the electrochemical compressor, not depicted. In accordance with certain embodiments, this electrochemical compressor is a membrane electrode assembly (MEA), as shown in FIG. 4 and described further below. The $O_2$ can then be released on the opposite side of the electrolyte membrane as an oxygen stream 34 at $T_1$ and a higher pressure $P_1$ (e.g., nominally about 50 bar), which may correspond to the pressure used in the combustor. Additionally, an oxygen depleted air stream 28 containing predominately $N_2$ (along with any other residual gases typically present in air) may exit out of the electrochemical compressor 40 at $P_0$ and $T_1$. Next, the hot ($T_1$=700 to 900° C.) flow of separated $O_2$ exiting out of the electrochemical compressor (e.g., oxygen stream 34) and the hot ($T_1$=700-900° C.) flow of $O_2$ depleted air stream 28 (i.e., mostly $N_2$) may be then cooled back to a relatively low temperature (e.g., room temperature) via the two heat exchangers 20 and 30, where the resultant heat may be transferred to preheat the flow of incoming air streams 16 and 18. Specifically, after passing through the heat exchanger 20, the hot oxygen depleted air stream 28 at $P_0$, $T_1$ exits as a cooled oxygen depleted stream 32 having $P_0$ and $T_0+\Delta T$. Similarly, after passing through the heat exchanger 30, the hot oxygen stream 34 exits as a cooled oxygen stream 36 having $P_1$ and $T_0+\Delta T$.

Referring again to the embodiment of FIG. 2, a compressed oxygen outlet of the electrochemical compressor 40 may in fluid communication with a combustor 50. Additionally, in some embodiments, the electrochemical compressor may be in fluid communication with the combustor through one or more heat exchangers 30 is depicted in the figure. However, embodiments in which the output oxygen stream does not flow through a heat exchanger prior to flowing into the combustor also contemplated. In either case, the cooled and pressurized $O_2$ exiting out of the heat exchanger via oxygen stream 36 can then flow into the combustor 50 along with a fuel stream 38 from an associate fuel source, such as a pressurized gas tank, fuel pump, or other appropriate fuel source. The fuel stream may have a pressure and temperature $P_1$, To and may comprise a fuel, e.g., such as methane ($CH_4$). In accordance with certain embodiments, as shown in FIG. 2, the combustor 50 (e.g., an oxycombustor or other appropriate combustor) is configured to combust the oxygen (e.g., oxygen stream 36) from the electrochemical compressor with the fuel (e.g., $CH_4$) from a fuel source (e.g., fuel stream 38) to produce an exhaust stream 42 comprising combustion products that are exhausted from an outlet of the combustor. In some embodiments, substantially all of the combustion products are gaseous $H_2O$ and $CO_2$. The exhaust stream 42 may have a pressure that is greater than $P_1$ and an elevated temperature $T_H$, which as noted above $P_1$ may be between or equal to 20 atm and 70 atm and $T_H$ may be between or equal to 1200° C. to 1500° C., though other appropriate temperatures and pressures may also be used depending on the particular system design.

According to certain embodiments, the oxygen and the fuel is combusted to drive a power turbine (e.g., an expander turbine) that is in fluid communication with an exhaust outlet from the combustor. For instance, as shown in FIG. 2, the exhaust stream 42 comprising combustion products $H_2O$ and $CO_2$ exiting out of the combustor 50 may be fed to a turbine 60 in fluid communication with the combustor 50. In some embodiments, it should be noted that since a turbine (e.g., expander turbine) can reliably operate at temperatures up to 1400-1500° C., the temperature of the combustion products including $H_2O$ and $CO_2$ entering into the turbine may be less than or equal to about 1400-1500° C. in some embodiments. For instance, the exhaust stream 42 may have a temperature $T_H$ of less than or equal to 1550° C., less than or equal to 1500° C., less than or equal to 1400° C., or less than or equal to 1300° C. In some cases, the exhaust stream 42 entering the turbine may have a temperature $T_H$ of greater than or equal to 1200° C., greater than or equal to 1300° C., greater than or equal to 1400° C., or greater than or equal to 1500° C. Combination of the above-referenced ranges are possible (e.g., greater than or equal to 1200° C. and less than or equal to 1550° C.). Other range are also possible.

If only $O_2$ and a fuel (e.g., $CH_4$) were used in the combustor during a combustion process, the exhaust may exit the combustor near the adiabatic flame temperature, which may be a temperature that exceeds an allowable operating temperature range of the turbine described above. In some such embodiments, a diluent stream 58 may be introduced into the combustor 50 from a diluent source in fluid communication with the combustor to lower the temperature associated with exhaust stream 42.

In the above embodiment, if only $O_2$ and a fuel such as $CH_4$ were used in the combustor, the exhaust stream would have an adiabatic flame temperature for $CH_4$ with $O_2$ (at a stoichiometric ratio of the two) of about 4600° C. On the other hand, the adiabatic flame temperature for combusting $CH_4$ with air is about 1960° C., which is much lower than combusting with pure $O_2$. This may be associated with the extra heat capacity and thermal mass associated with the non-reacting gas species ($N_2$) in air—since all of the reaction enthalpy goes towards heating the exhaust products to a higher temperature (i.e., sensible heating). Furthermore, in the case of combusting $CH_4$ with air, excess air can be used to further reduce the exhaust temperature down to about 1400-1500° C., which is a temperature range that allows for reliable operation of an expander turbine. In this case, as shown in FIG. 2, since a pure $O_2$ stream 36 is combusted with the fuel stream 38 (e.g., $CH_4$) in an oxycombustion process, a diluent may be used to reduce the adiabatic flame temperature from about 4600° C. to about 1400-1500° C. to avoid damage to the gas turbine components. As shown, a diluent $H_2O$ stream 58 (at $P_1$ and $T_{condense}$) may be transported into the combustor as a diluent to reduce an average temperature of the combustor 50 during combustion and the temperature of the resultant exhaust stream 42 (at $>P_1$ and $T_H$) which may include the combustion products and diluent. The diluent $H_2O$ stream 58 used in the combustor 50 during oxycombusion may be an exclusively recycled flow of condensed $H_2O$ (at $P_1$ and $T_{condense}$) resulting from subsequent $H_2O$ and $CO_2$ separation later in the cycle as described in more detail below. Though other types of diluents other than $H_2O$ and/or other sources of diluents (e.g., external source of $H_2O$ that is not from a recycled flow of condensed $H_2O$) may be used as the disclosure is not limited in this fashion.

As noted above, after combustion, the exhaust stream 42 may pass through the turbine 60 (e.g., operating via a Brayton cycle or other appropriate power cycle) and generate power in the form of work $W_1$. Once exhaust stream 42 exits the expander turbine as stream 44, it can be routed to a Rankine cycle 65, which may serve as a bottoming cycle to generate power in the form of work $W_2$, as well as heat $Q_{waste}$. The resultant stream 44 of $H_2O$ and $CO_2$ exiting the turbine 60 may have a lower temperature ($T_2$=500° C. to 700° C.) and pressure ($P_0$=1 atm) compared to the exhaust stream 42 (at $T_H$=1200° C. to 1500° C., and $P_1$>20 atm to 70 atm).

As shown in FIG. 2, the relatively hot ($T_2$=500° C. to 700° C.) stream of $H_2O$ and $CO_2$ (e.g., stream 44) exiting the turbine 60 may be used to boil and superheat a closed loop of $H_2O$, or other medium, in one or more Rankine cycles 65, or other appropriate power cycles. In the depicted embodiment, the Rankine cycle may correspond to a Rankine power system with a boiler, turbine, condenser, pump, and other appropriate components. The Rankine cycle may produce additional work (e.g., $W_2$) and raise the overall cycle efficiency of the combined power plant system. A flow of $H_2O$ and $CO_2$ (e.g., stream 46) may exit the Rankine cycle at temperature $T_{condense}$ of 100° C. and pressure $P_0$ of 1 atm. It should be noted that although FIG. 2 illustrates an embodiment where the system comprises both a turbine and a Rankine cycle, it should be understood that the system is not so limited, and that in certain instances, the turbine and/or the Rankine cycle may be absent or replaced by other systems and power cycles having similar functions.

In accordance with certain embodiments, as shown in FIG. 2, the system 100 may further comprise a condenser 70 that is in fluid communication with and downstream from the combustor 50 configured to condense the gaseous $H_2O$ and produce a flow of substantially pure $CO_2$. For instance, as shown in FIG. 2, the stream 46 of $H_2O$ and $CO_2$ is next routed to a condenser 70 in fluid communication with the Rankine cycle 65 and turbine 60. In condenser 70, $H_2O$ is condensed at $T_{condense}$ (e.g., about 100° C.) and exits as a stream 52 of condensed water at $P_0$, $T_{condense}$, thus leaving behind a substantially pure humid $CO_2$ stream that exits the condenser as stream 48. The separation of $CO_2$ described herein illustrates carbon capture and separation (CCS) using the combined power plant system. Furthermore, a heat of condensation ($Q_{waste}$) associated with the $H_2O$ in the exhaust may be generated by the condenser during the separation of $CO_2$ from $H_2O$.

Figure 3:
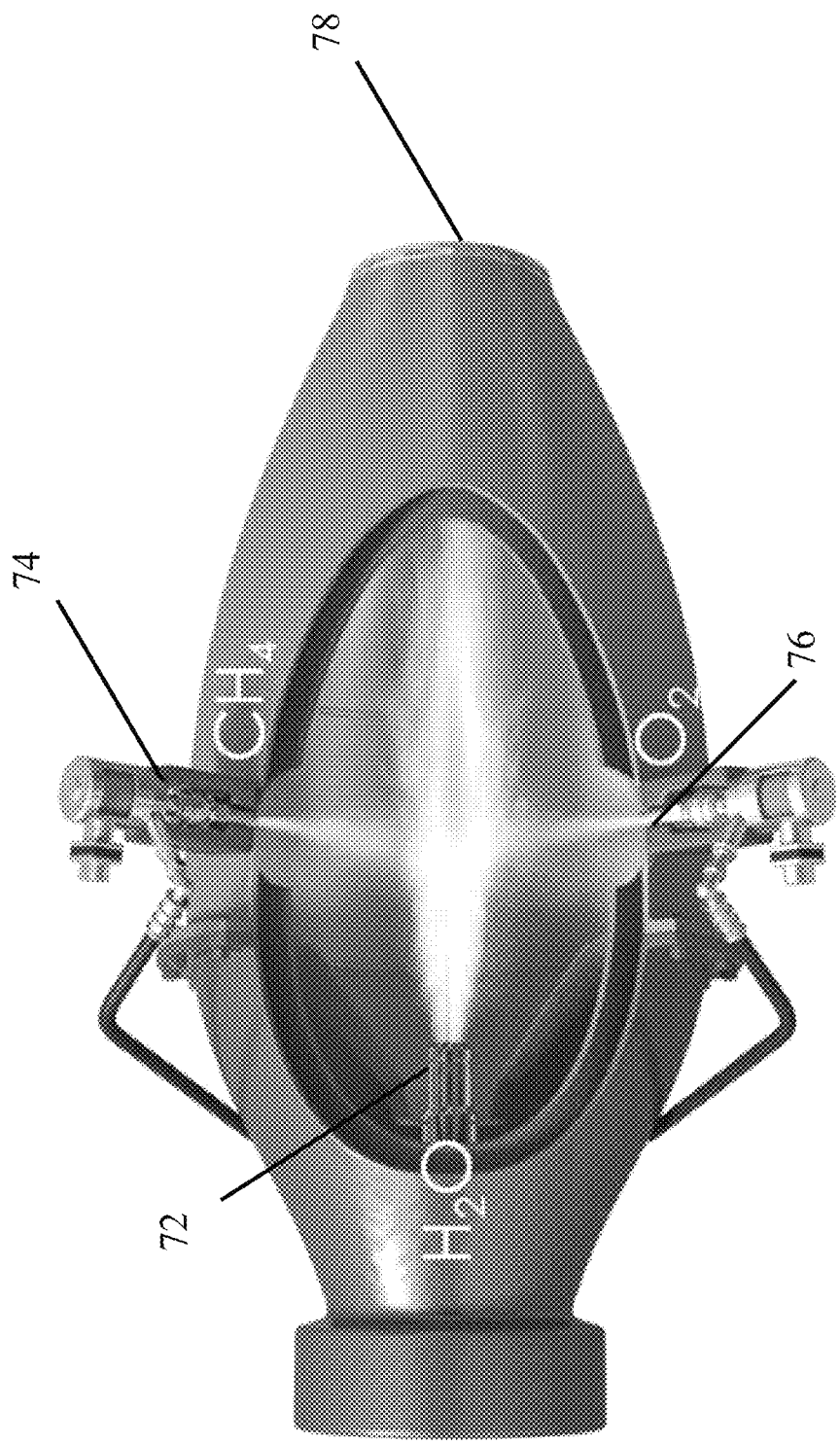
FIG. 3 is an illustration of a combustor used in a combined power plant system, in accordance with certain embodiments.

In some embodiments, as shown in FIG. 2, at least a portion of the condensed liquid $H_2O$ stream 52 exiting out of the condenser 70 may be recycled as recycled stream 56 (at $P_0$, $T_{condense}$) and subsequently fed to the combustor as a diluent to lower the adiabatic flame temperature inside the combustor 50. Additionally, a second portion the condensed liquid $H_2O$ stream 52 may exit the system 100 as waste stream 54 and may be stored for future use and/or disposed of properly based on local conditions and requirements. In some embodiments, as shown in FIG. 2, prior to entering into the combustor 50, the recycled stream 56 of condensed liquid $H_2O$ may next be passed through a pump 80 that is in fluid communication with a condensed water outlet of the condenser 70. The pump may increase a pressure of the water from atmospheric ($P_0$=1 atm), or other appropriate pressure, to a higher pressure $P_i$. In some embodiments, it may be advantageous for the molecule/substance used for dilution to enter the combustor around the same pressure as the fuel (e.g., $CH_4$) and $O_2$ entering into the combustor via streams 36 and 38. In some such embodiments, a specific amount of work $W_{pump}$ can be supplied to the pump to raise the pressure of the recycled stream 56 of liquid $H_2O$ to be nominally at the same pressure as the fuel and $O_2$ (e.g., streams 38 and 36) entering into the combustor 50. For instance, the diluent stream 58 of $H_2O$ exiting out of pump 80 may have a temperature $T_{condense}$ and a pressure $P_1$ (e.g., about 50 bar), though other appropriate temperatures and pressures may also be used. In some embodiments, the water from the diluent stream may be vaporized by combustion, i.e., by spraying water droplets into the combustor and are output from the combustor through the exhaust outlet as part of the exhaust stream 42 previously described. FIG. 3 describes one such embodiment of a combustor 50 described in FIG. 2. In FIG. 3, combustor 50 comprises a diluent inlet 72 (e.g., a $H_2O$ inlet), a fuel inlet 74 (e.g., a $CH_4$ inlet), and an oxygen inlet 76. As shown in FIG. 3, at the same time that the fuel and $O_2$ are combusted, water droplets, or other another appropriate diluent, are sprayed via diluent inlet 72 from an incoming diluent stream (e.g., diluent stream 58 in FIG. 2) and vaporized to lower the flame temperature of the resultant combustion products, e.g., gaseous $H_2O$ and $CO_2$. The combustor may also include a combustor outlet 78 through which the combustion products and vaporized diluent may flow to form the desired exhaust stream previously described above. It is worthwhile to point out that in some embodiments, the $Q_{waste}$ from both the bottoming Rankine cycle 65 and the condenser 70 may be used to preheat/vaporize some of the condensed liquid $H_2O$ stream before the condensed liquid $H_2O$ enters the combustor as diluent stream 58. This may be done using any appropriate arrangement of one or more heat exchangers associated with the Rankine cycle and condenser. This may advantageously enhance the overall efficiency of the combined power plant system 100.

In accordance to certain embodiments, the combined power plant system 100 of FIG. 2 may have a relatively high cycle efficiency described elsewhere herein (e.g., at least 0.63). The cycle efficiency may be calculated as the net work output ($W_1$ from the expander turbine, $W_2$ from the Rankine cycle, $W_{pump}$ from driving the water pump, and $W_{EOC}$ from operating the electrochemical compressor) divided by the heat input into the turbine (net enthalpy associated with combustion).

FIG. 4 describes one embodiment of an electrochemical compressor 40 in the form of a membrane electrode assembly stack (MEA) stack. In FIG. 4, the membrane electrode assembly (MEA) stack comprises a cathode 82, an anode 86, and a membrane 84 (e.g., solid electrolyte) disposed between the cathode and the anode. The MEA stack may further comprise a first interconnector 80 disposed directly on a surface of the cathode 82 (a surface opposing the surface adjacent the membrane), and a second interconnector disposed directly on a surface of the anode 86 (a surface opposing the surface adjacent the membrane). As shown in FIG. 4, the stack further comprises gas channels (e.g., air channels 90 and oxygen channel 92), and edge seals 94 surrounding (or encapsulating) a substantial portion of the cathode, anode, and electrolyte. The edge seals may seal and isolate the interior of the stack from an exterior environment surrounding the electrochemical compressor. In some embodiments, the gas channels may be formed in the cathode and anode layers, and may be in fluid communication with one or more corresponding air inlets, depleted oxygen outlets, and pressurized oxygen outlets of the electrochemical compressor depending on which layer the channel is formed in.

The components of the MEA stack described herein may comprise any of a variety of suitable materials. For instance, in one set of embodiments, two main materials may be used to fabricate the membrane electrode assembly stack: an electronically-conducting oxide $(La,Sr)MnO_3$ (LSM) and an ionically-conducting oxide $Y_2O_3$-stabilized $ZrO_2$ (YSZ). At least one or more of these materials may be used to form the components within the membrane electrode assembly stack, including the LSM-YSZ electrodes, the LSM interconnectors, the YSZ electrolyte layers, and the YSZ edge seals. The LSM interconnectors, YSZ electrolyte layers, and YSZ edge seals are densified, whereas the LSM-YSZ electrodes and gas channel structures are porous.

In operation, the tri-layered MEA cell may electrochemically transport and compress oxygen from the air channels 90 associated with the anode 86 into the oxygen channels 92 associated with the cathode 82, while the depicted interconnectors 80 and 88 electrically coupled to the anode 86 and cathode 82 may function as electronic current pathways. In the depicted embodiment, the ceramic components YSZ and LSM may comprise gas seals 94 in this unitized structure that may allow the components to be fired together in one step, forming intimate crack- and pore-free contacts for hermetic gas sealing. In this approach, conventional gas seals, along with the mechanical compression used to form them may be eliminated. The resultant MEA stack may have a variety of advantages. For instance, in some embodiments, a thin YSZ electrolyte (e.g., about 10 microns) may allow for high area-specific current densities and oxygen generation rates. Additionally, the high membrane area per unit volume of the depicted embodiment may also provide high oxygen flux for a reasonable size of membrane. Furthermore, the intimate electrical contacts between the cells, interconnects, and gas channel structure can be formed to minimize contact resistance.

Many methods may be used to produce the MEA stack shown in FIG. 4, in accordance with certain embodiments. For instance, the MEA stack may be produced as a single ceramic part and co-fired together in a single step. Tape casting may be used to produce the tri-layer cell, the edge gas seals, and LSM interconnect, whereas three-dimensional (3D) printing, plasma spray or tape casting with laser cutting may be used to introduce the 3D gas distribution networks. However, embodiments in which different manufacturing techniques are used are also contemplated as the disclosure is not limited in this fashion.

It should be noted that a relatively high (1400° C.) firing temperature may be used to densify YSZ electrolyte layers described in FIG. 4. However, the relatively high firing temperature may not be suitable for LSM interconnectors and LSM-YSZ electrodes, which sinter at a much lower temperatures. Also, a high firing temperature may lead to unfavorable interactions between LSM and YSZ. For instance, magnesium (Mn) diffusion into YSZ may lead to unfavorable void formation in the electrolyte, and formation of resistive Sr- or La-zirconate phases at the interface. Therefore, in some embodiments, a lower temperature co-firing scheme may be used to avoid interdiffusion and reactions between materials and avoid over-densification of LSM, while achieving sufficient sintering in electrolyte and interconnector layers such that these components can become mechanically robust, dense, and gas tight. For instance, the tri-layer LSM-YSZ/YSZ/LSM-YSZ cell structure may be co-fired as low as 1250° C., to achieve reasonably dense YSZ electrolyte and the desired level of porosity in both electrodes.

Although FIG. 4 illustrates one embodiment (a MEA stack) of an electrochemical compressor, it should be understood the electrochemical compressor used in the combined power plant systems disclosed herein is not so limited, and that any suitable types and/or designs of electrochemical compressors may be used in the various disclosed embodiments of combined power plant systems described herein.

Example 1

Figure 5:
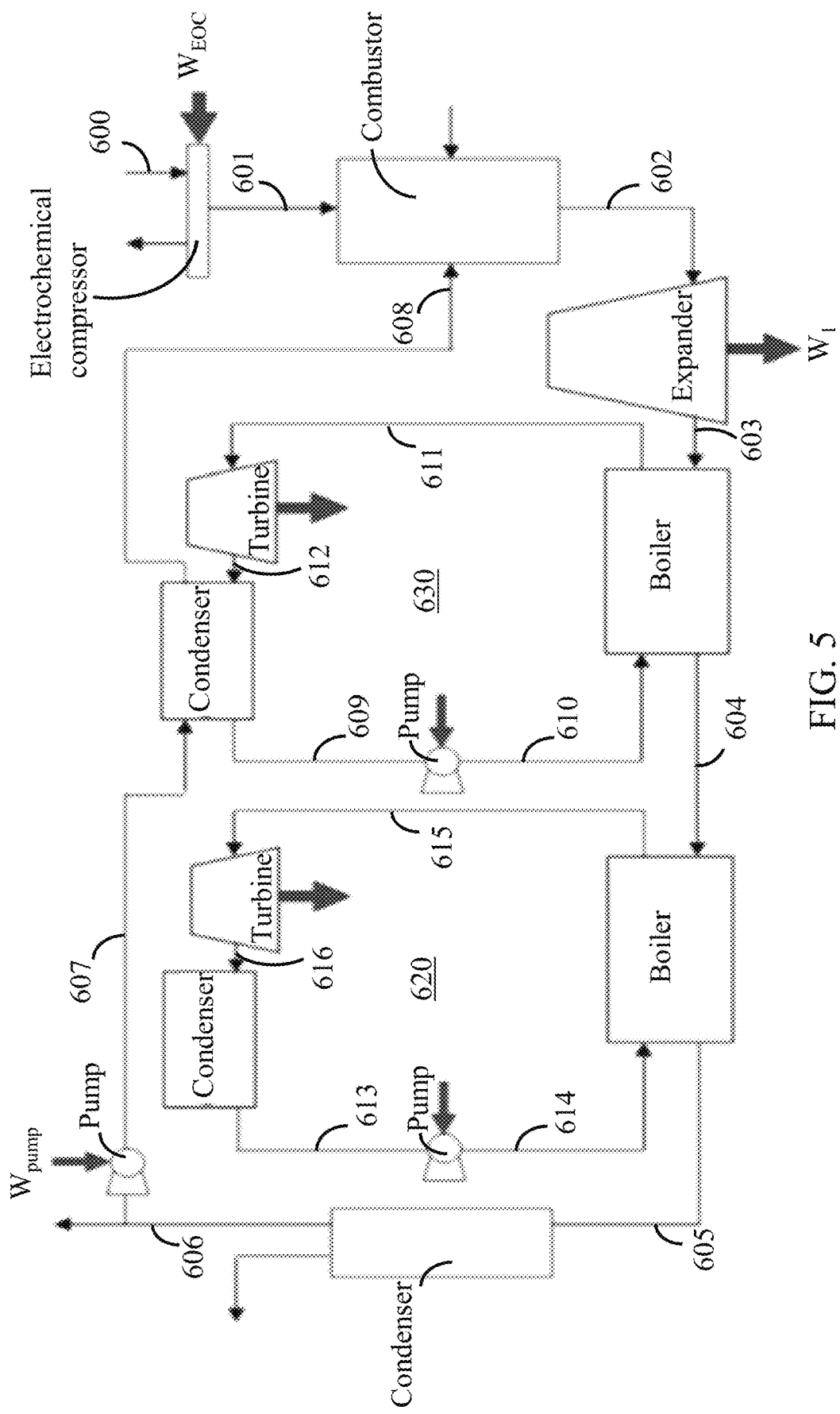
FIG. 5 is a diagram of a combined power plant system used in thermodynamic analysis and modeling, in accordance with certain embodiments.

This example illustrates that an electrochemical oxygen compression combined cycle (EOC3) could yield an overall cycle efficiency of greater than 60%. A thermodynamic analysis was conducted to show that an efficiency >63% could be achievable. A detailed breakdown of the combined cycle system is shown in FIG. 5, accompanied by the relevant compositional and thermodynamic data in Table 1 (e.g., composition, temperature, pressure, flow rate) associated with the combined cycle system in FIG. 5. The arrows in FIG. 5 are used to indicate work input and output from each unit operation. The set of data presented in Table 1 was used in the thermodynamic analysis to calculate the overall cycle efficiency.

TABLE 1

| Location | Composition | Pressure (bar) | Temperature (° C.) | Flow Rate (kmol/sec) |
|---|---|---|---|---|
| 600 | $O_2$ | 1.0 | 25.1 | 2 |
| 601 | $O_2$ | 50 | 45.1 | 2 |
| 602 | $CO_2, H_2O$ | 50 | 1527 | 1, 8.39 |
| 603 | $CO_2, H_2O$ | 1.1 | 623.1 | 1, 8.39 |
| 604 | $CO_2, H_2O$ | 1.1 | 373.9 | 1, 8.39 |
| 605 | $CO_2, H_2O$ | 1.1 | 39.2 | 1, 8.39 |
| 606 | $H_2O$ | 1.1 | 39.2 | 6.39 |
| 607 | $H_2O$ | 50 | 39.4 | 6.39 |
| 608 | $H_2O$ | 50 | 192.5 | 6.39 |
| 609 | $H_2O$ | 58.5 | 267 | 2.3 |
| 610 | $H_2O$ | 300 | 273 | 2.3 |
| 611 | $H_2O$ | 300 | 600 | 2.3 |
| 612 | $H_2O$ | 58.5 | 326.1 | 2.3 |
| 613 | $H_2O$ | 0.04 | 28.9 | 9.87 |
| 614 | $H_2O$ | 145 | 29.2 | 9.87 |
| 615 | $H_2O$ | 145 | 363 | 9.87 |
| 616 | $H_2O$ | 0.04 | 28.9 | 9.87 |

Specifically, as shown in FIG. 5, the Rankine cycle was broken down into two stages: a first stage (620) that comprises a high temperature, high pressure cycle, that dissipated its waste heat directly to the condensed liquid $H_2O$ (607) being recycled into the combustor, and a second stage (630) that comprises a lower temperature lower pressure Rankine cycle designed to scavenge waste heat from the exhaust stream (including the heat of condensation from $H_2O$, released when separating out $CO_2$). This second stage (630) of the Rankine cycle then dissipated its waste heat to the environment at about 40° C., similar to a normal steam Rankine cycle. The temperatures and pressures at each point in the depicted overall system are provided in the table above (points 600-616). These thermodynamic calculations accounted for the voltage used by the electrochemical compressor and included estimates for the overpotential associated with the losses in the electrochemical compressor, nominally about 0.05 V.

This thermodynamic analysis showed that a higher cycle efficiency of about 0.63 could be achieved using the EOC3 system. The higher cycle efficiency could be used to offset the higher cost of the electrochemical compressor system, thus making the levelized cost of electricity (LCOE) for the EOC3 equal to or somewhat lower than that of a natural gas combined cycle (NGCC).

As a next step, different configurations of the EOC3 system can be studied and evaluated to maximize efficiency and flexibility. Thermodynamic calculations can be performed for these configurations. An integrated power plant techno-economic model can be built to explore all these possibilities. A preliminary analysis reached 63% using an electrochemical compressor in tandem with a Rankine cycle, but other options may have similar efficiencies and/or other advantages, such as lower cost or improved flexibility when the entire system is optimized together. For configurations making usage of bottoming Rankine cycles, areas for optimization may include the preheating and/or vaporizing of recycled water, as was done in the system presented in FIG. 5. However, there are other changes to the configuration that may also further improve efficiency and flexibility. For example, one possible way to improve efficiency is to use some of the heat generated in the electrochemical compressor (due to electrochemical losses) to power the steam Rankine cycle. Another opportunity to improve efficiency is to explore operating conditions closer to the supercritical limits associated with higher pressure oxy-combustion cycles.

Example 2

This example illustrates the fabrication of an electrochemical compressor, e.g., a membrane electrode assembly, in accordance with certain embodiments. The membrane electrode assembly (MEA) design may be the same as the structure in FIG. 4. The main challenge addressed in this example is developing the materials processing methods that can be used produce this structure, i.e., achieving materials' microstructures that allows good stack electrochemical performance. The focus in this example is on the fabrication of the basic unit cell structure to produce a single trilayered cell that can be used to validate various performance metrics. Note that the single-cell prototype may feature open air channels but closed oxygen channels—the latter is an achievable structure that is amenable to a range of tests.

Tape casting may be used to produce the tri-layer cell and LSM interconnect layers shown in FIG. 4. Three-dimensional (3D) extrusion printing or tape casting with laser cutting, and possibly plasma spray can be used to introduce the patterned gas distribution networks and YSZ edge seals. The different components may be assembled and then laminated into a unitized structure. It should be noted that the tape casting and 3D printing slurries may utilize the same polymeric binder in a similar formulation, which makes the 3D printing slurries amenable to lamination. In order to co-fire the laminated multi-material structure to produce a flat un-cracked cell, all components may undergo the same amount of shrinkage during firing.

Slurry formulations and firing conditions may be optimized in order to ensure that the YSZ and LSM components are sufficiently dense, and that the LSM-YSZ electrodes have sufficient porosity. In most cases, an additional catalyst material may be introduced to enhance the electrochemical performance of the LSM-YSZ electrodes. Non-limiting examples of such catalyst materials are $(Sm,Sr)CoO_3$, $Sr(T_1,Fe,Co)O_3$, or PrOx.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

What is claimed is:

1. A combined cycle power plant system, comprising:
   an air source;
   a fuel source;
   an electrochemical compressor in fluid communication with the air source, wherein the electrochemical compressor is configured to separate oxygen from a flow of air from the air source;
   a combustor in fluid communication with the fuel source and electrochemical compressor, wherein the combustor is configured to combust the oxygen from the electrochemical compressor with fuel from the fuel source;
   a power turbine in fluid communication with the combustor.

2. The system of claim 1, further comprising at least one heat exchanger fluidically coupled to the electrochemical compressor, and wherein the at least one heat exchanger is configured to preheat the flow of air from the air source.

3. The system of claim 1, wherein the combustor comprises an oxy-combustor.

4. The system of claim 1, further comprising a condenser downstream from and in fluid communication with the combustor, wherein the condenser is configured to condense gaseous $H_2O$ to produce a flow of $CO_2$.

5. The system of claim 4, wherein at least a portion of the condensed $H_2O$ is used as a diluent to reduce an average temperature of the combustion.

6. The system of claim 1, wherein the electrochemical compressor isothermally compresses the oxygen.

7. The system of claim 1, wherein an anode and a cathode of the electrochemical compressor are configured to have an electrical potential applied to separate the oxygen from the flow of air and to pressurize the oxygen.

8. The system of claim 1, wherein the electrochemical compressor comprises a membrane configured to separate the oxygen from the flow of air.

9. The system of claim 1, wherein a cycle efficiency is at least 0.63.

10. The system of claim 1, wherein combustion products from the combustion of the fuel and oxygen substantially comprise only gaseous $H_2O$ and $CO_2$.

11. The system of claim 10, wherein the combustion products from the combustion of the fuel and oxygen leaves the combustor at a temperature of greater than or equal to 1200° C. and less than or equal to 1500° C.

12. The system of claim 1, further comprising a Rankine cycle fluidically connected to the power turbine to allow further extraction of energy from the flow of $H_2O$ and $CO_2$ exiting out of the power turbine.

13. The system of claim 1, wherein the electrochemical compressor is configured to compress oxygen from the flow of air to a pressure that is greater than or equal to 20 atm and less than or equal to 70 atm.

14. The system of claim 1, wherein the electrochemical compressor further comprises gas channels configured to direct the flow of air to the electrochemical compressor and separated flows of air and oxygen out of the electrochemical compressor.

15. A method comprising:
separating oxygen from a flow of air using an electrochemical compressor;
flowing the separated oxygen into a combustor; and
combusting the oxygen with a fuel to drive a power turbine.

16. The method of claim 15, further comprising preheating the flow of air with heat from the separated oxygen and/or a flow of oxygen depleted air from the electrochemical compressor.

17. The method of claim 15, further comprising condensing gaseous $H_2O$ to produce a flow of $CO_2$.

18. The method of claim 17, wherein at least a portion of the condensed $H_2O$ is used as a diluent to reduce an average temperature of the combustion.

19. The method of claim 15, wherein the electrochemical compressor isothermally compresses the oxygen.

20. The method of claim 15, applying an electrical potential between an anode and a cathode of the electrochemical compressor to separate the oxygen from the flow of air and to pressurize the oxygen.

21. The method of claim 15, wherein the electrochemical compressor comprises a membrane configured to separate oxygen from the flow of air.

22. The method claim 15, wherein combustion products from the combustion of the fuel and oxygen substantially comprise only gaseous $H_2O$ and $CO_2$.

23. The method of claim 22, wherein the combustion products from the combustion of the fuel and oxygen leaves the combustor at a temperature of greater than or equal to 1200° C. and less than or equal to 1500° C.

24. The method of claim 15, further comprising extracting energy from the flow of $H_2O$ and $CO_2$ exiting out of the power turbine using a Rankine cycle fluidically connected to the power turbine.

25. The method of claim 15, wherein the electrochemical compressor is configured to compress oxygen from the flow of air to a pressure that is greater than or equal to 20 atm and less than or equal to 70 atm.

26. The method of claim 15, wherein the electrochemical compressor further comprises gas channels configured to direct the flow of air to the electrochemical compressor and separated flows of air and oxygen out of the electrochemical compressor.

* * * * *